Nov. 19, 1935.　　G. H. PFEFFERLE ET AL　　2,021,745
THREADED FOLLOWER PIPE JOINT OR FITTING
Filed Feb. 23, 1933　　4 Sheets-Sheet 1
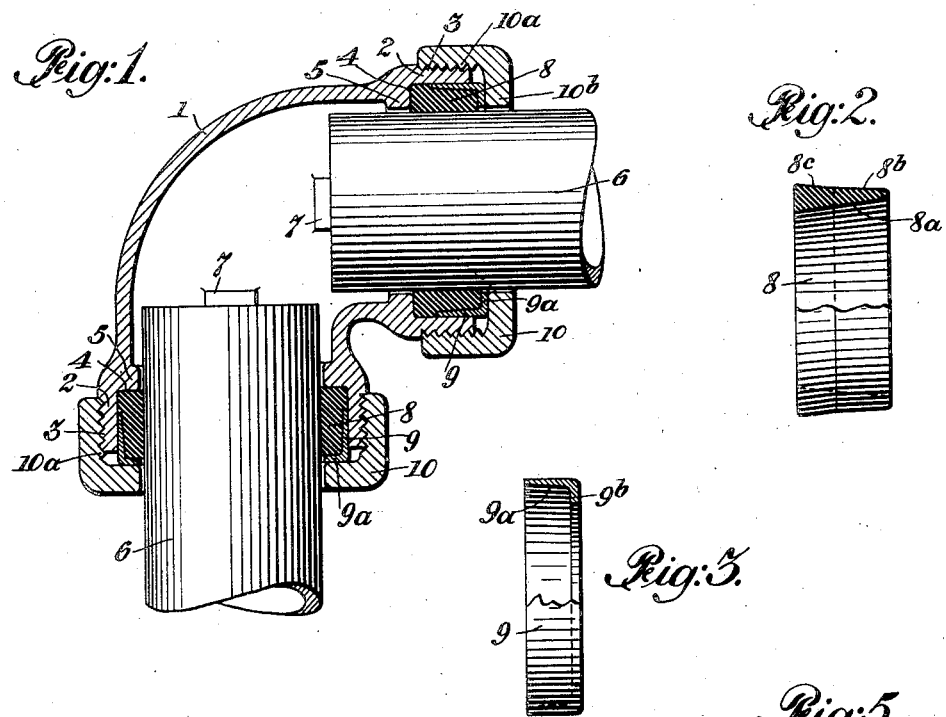
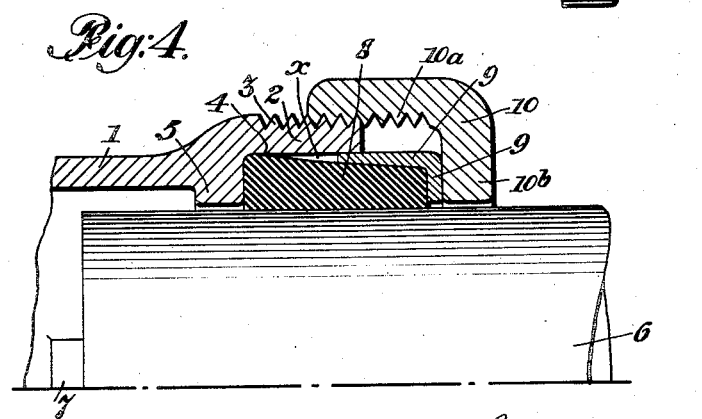
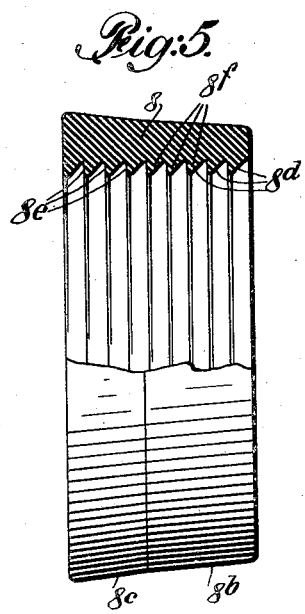
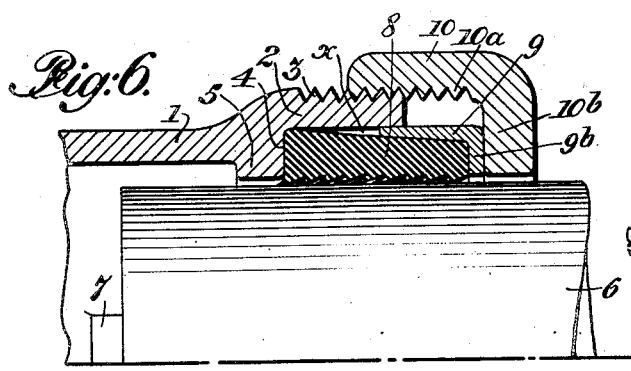

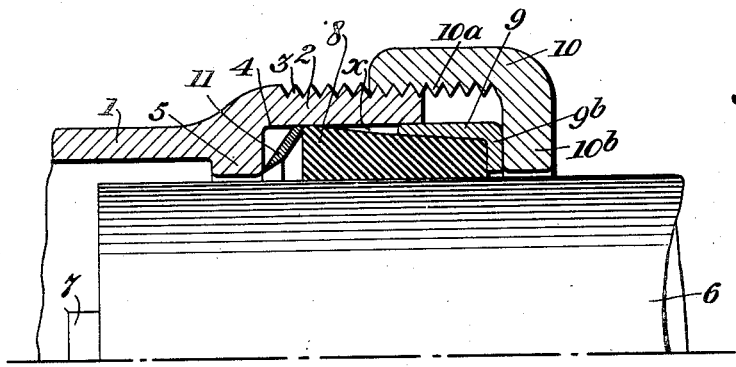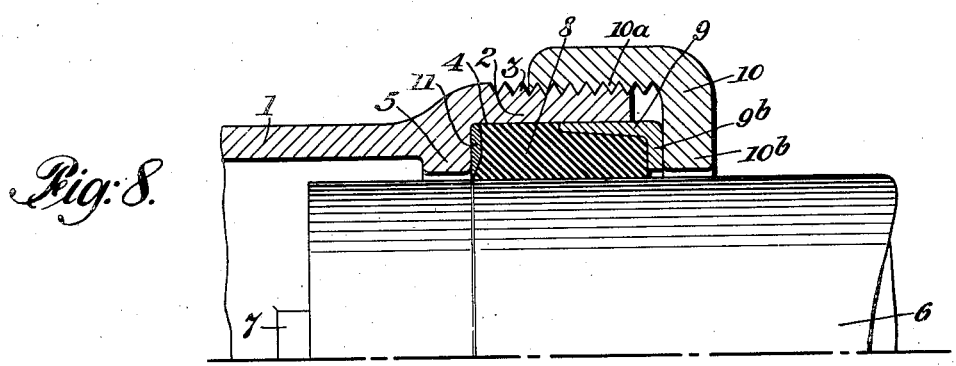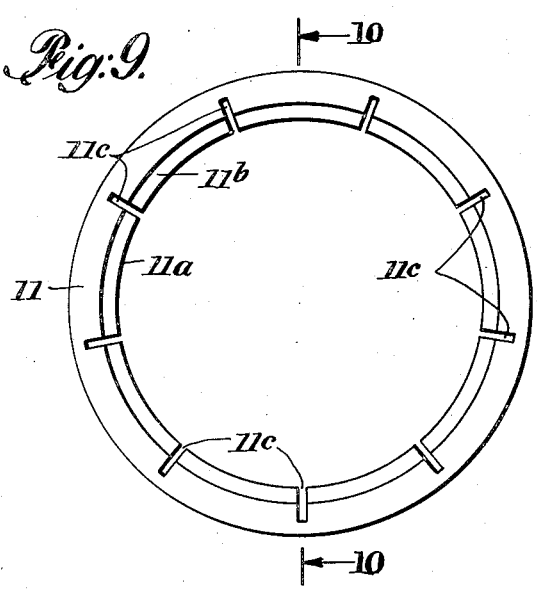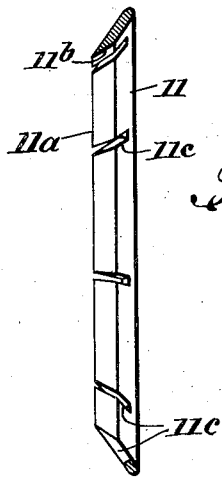

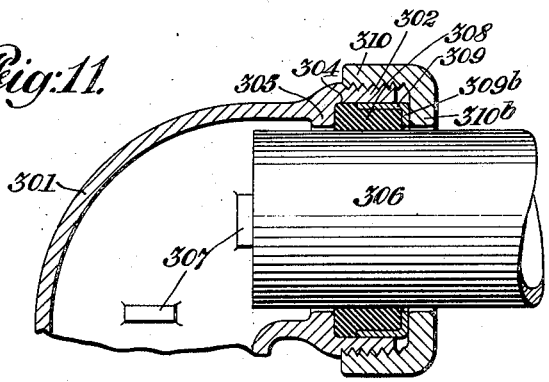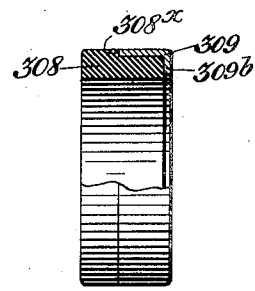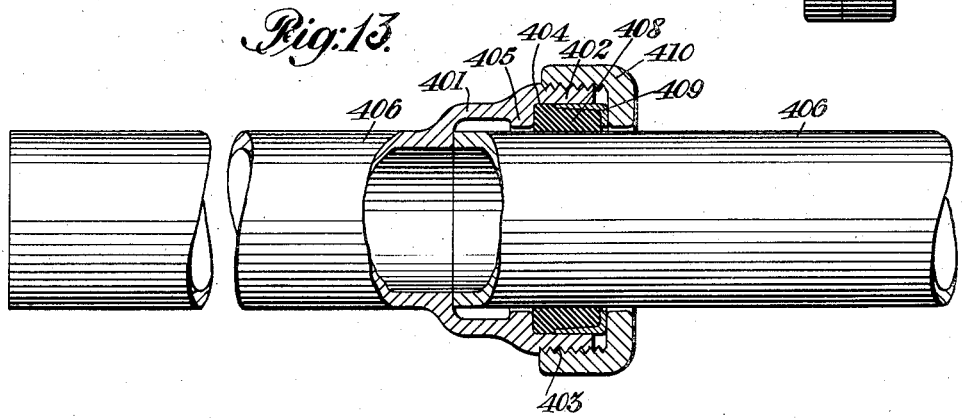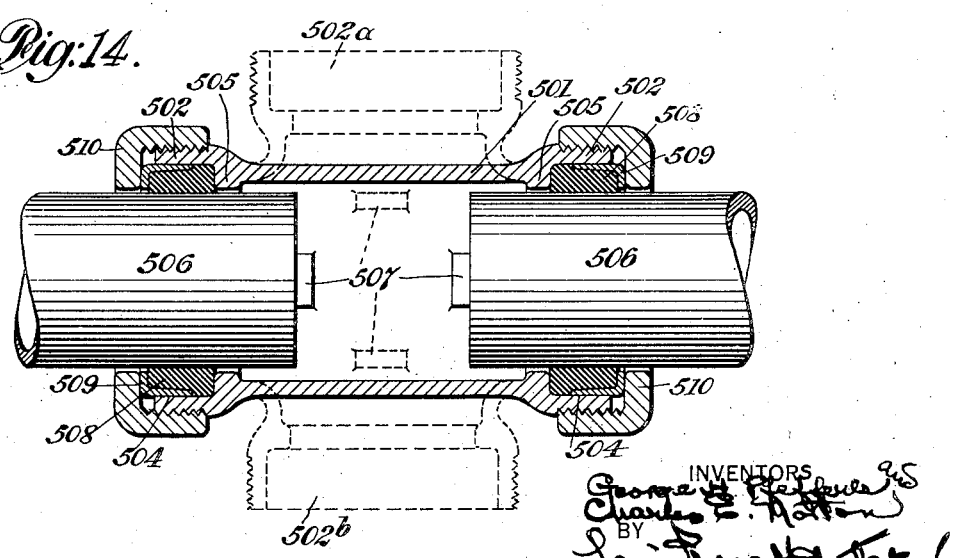

Nov. 19, 1935.   G. H. PFEFFERLE ET AL   2,021,745
THREADED FOLLOWER PIPE JOINT OR FITTING
Filed Feb. 23, 1933   4 Sheets-Sheet 4
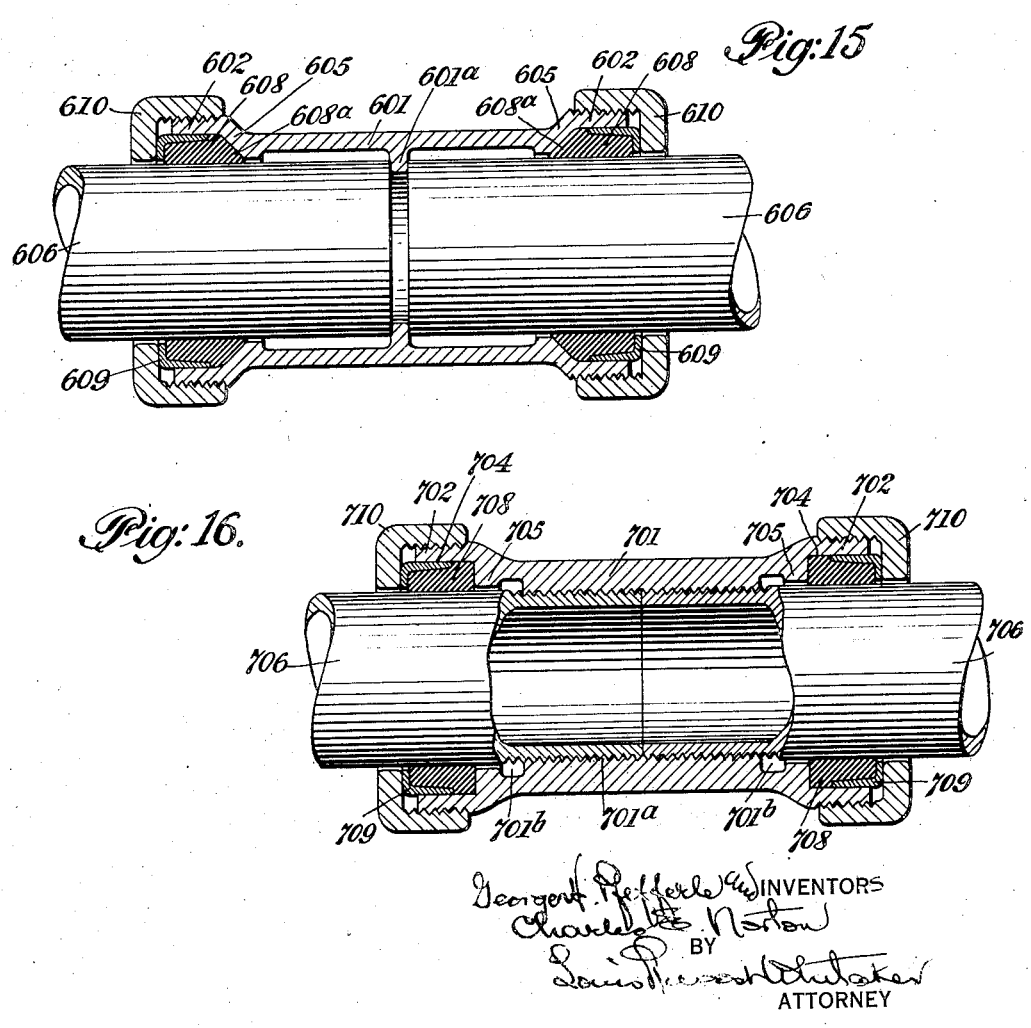

Patented Nov. 19, 1935

2,021,745

UNITED STATES PATENT OFFICE 2,021,745

THREADED FOLLOWER PIPE JOINT OR FITTING

George H. Pfefferle and Charles E. Norton, Bradford, Pa., assignors to S. R. Dresser Manufacturing Company, Bradford, Pa., a corporation of Pennsylvania Application February 23, 1933, Serial No. 658,004

16 Claims. (Cl. 285—122)

Our invention consists in the novel features hereinafter described, reference being had to the accompanying drawings, which show the best form in which we have embodied the invention, and several modifications, selected by us for purposes of illustration, and the said invention is fully disclosed in the following description and claims.

The object of our invention is to provide an extremely simple, cheap and efficient threaded follower pipe joint or fitting for plain end or threaded end pipes, and applicable to all forms of joints, usually provided for threaded pipes, such as couplings, L's, T's, crosses, and also applicable to bell and spigot joints, and which can be made up in any of the forms, in different sizes to accommodate plain end or threaded end pipe sections of different standard diameters, and accommodate the variations encountered in the actual external diameters of commercial pipes of any standard size.

Our invention also includes certain novel features of construction and combination of parts hereinafter fully described and particularly pointed out in the claims.

In the accompanying drawings,

Fig. 1 is a sectional view of a fitting in the form of an L embodying our invention.

Fig. 2 is a detail sectional view of the gasket shown in Fig. 1, in its uncompressed condition.

Fig. 3 is a detail sectional view of the follower cup shown in Fig. 1.

Fig. 4 is an enlarged sectional view of a portion of one end of the fitting shown in Fig. 1, showing the relation of the parts before the follower nut is tightened or drawn up.

Fig. 5 is a detail sectional view of a modified form of gasket.

Fig. 6 is a view similar to Fig. 4, showing the gasket illustrated in Fig. 5, in place.

Fig. 7 is a view similar to Fig. 4, showing a locking ring which we may employ in our improved fittings, the parts being shown in their relative positions before the follower nut is tightened.

Fig. 8 is a view similar to Fig. 7, but with the follower nut tightened.

Fig. 9 is a plan view of the locking ring shown in Figs. 7 and 8.

Fig. 10 is a sectional view on line 10—10 of Fig. 9.

Fig. 11 is a partial sectional view of an L fitting, showing the follower in cup form and fitting an exterior portion of the gasket, of reduced diameter.

Fig. 12 is an enlarged partial sectional view of the gasket and follower shown in Fig. 11.

Fig. 13 is a sectional view of a bell and spigot pipe section showing the bell and formed to cooperate with the other members of our fitting.

Fig. 14 is a diagrammatic view showing in full lines a sleeve or collar formed at each end to cooperate with the other members of our fitting and showing in dotted lines the manner in which our invention can be applied to T's and crosses.

Fig. 15 is a sleeve coupling for plain or threaded end pipes, embodying our invention.

Fig. 16 is a sleeve coupling adapted more particularly for use with threaded end pipes.

Referring to the form of our invention illustrated in Figs. 1 to 4, inclusive, I, represents the body of the fitting which may be a collar, L, T or cross, cr the bell portion of a bell and spigot pipe section, and which is provided with a cylindrical terminal portion, 2, where a joint with a plain pipe or threaded end, is to be effected, to surround the pipe end. These terminal portions are provided exteriorly with threaded portions, 3, and interiorly with an annular packing recess, 4, terminating at its inner end at the shoulder, 5, which preferably projects inwardly from the adjacent wall of the terminal portion, 2, and defines the pipe aperture. 6 represents a plain, i. e., unthreaded, pipe section which is entered within the pipe aperture, so that the outer surface of the pipe, 6, forms the inner wall of the packing recess, but the fitting may be used with threaded end pipe sections, as well.

We prefer to provide the interior of the body of the fitting, which may be of any suitable material such as iron, steel, brass, for example, and which will usually be cast, with one or more frangible stops, two of which are shown at 7, 7, in Fig. 1, at desired distances from the ends of the fitting, or the pipe aperture or apertures thereof, to limit the extent to which the pipe end can be pushed into the fitting. These stops can readily be made frangible by making them of such size and form that they can be broken off when desired, as for example, when the fitting is to be inserted in a line already laid, or whenever it is desirable to insert the pipe end to a greater distance than is provided for by the frangible stops.

Within the packing recess, 4, we employ a gasket, 8, a very desirable form of which is shown in Fig. 2. This gasket is preferably made of molded rubber or rubber composition, although we do not limit ourselves to this material. It is of annular form, as shown, and the inner face, 8a, is shown tapered from the outer end, inwardly toward the inner end of the gasket. This is important as the commercial pipe of any standard size varies from what may be termed the nominal external diameter, some pipes being oversize and some undersize. If the interior diameter of the gasket is made cylindrical and small enough to fit a minimum undersize pipe, it could not be forced over a nominal or oversize pipe. On the other hand, if the interior diameter of the gasket were cylindrical and large enough to accommodate a maximum oversize pipe, there would be a clearance between it and a nominal or undersize pipe, which would be difficult to take up in drawing up the follower nut, to compress the gasket longitudinally, and the result would be loss of pressure by leakage, and the escape of the pipe from the fitting.

We have found by experiment that by tapering the inner wall of the gasket from a diameter at its outer end equal to or slightly greater than the exterior diameter of a maximum oversize pipe of any standard size, to a diameter at its inner end equal to the outer diameter of the minimum undersize pipe of that standard size, we can assemble the fitting on any pipe of that standard size from maximum to minimum outer diameter and secure a sealing contact between the rubber and pipe, and a perfectly tight joint in every case.

The outer surface of the gasket adjacent to the outer end is preferably tapered slightly outwardly, as indicated at 8b, for a portion of the length of the gasket, say, for example, at an angle of two degrees to its axis, and the inner portion of the gasket has its outer surface tapered outwardly more sharply, as six degrees to its axis, as shown at 8c, in Fig. 2. This will produce an annular recess, triangular in cross section, indicated at x in Fig. 4, where the gasket emerges from the cup shaped follower, hereinafter described, into which the rubber can expand when the fitting is installed on normal or oversize pipe.

The inner end of the gasket substantially fits the inner end of the packing recess, 4, and the outer end is engaged by a follower interposed between the gasket and the follower nut to protect the gasket and prevent injury thereto, or distortion thereof. This follower is preferably in the form of a cup, 9, shown in detail in Fig. 3. This cup shaped follower is provided with a tapered inner face, 9a, (approximately two degrees to the axis) which engages the tapered portion, 8b, of the gasket. This tapered inner face enables us to provide a thicker wall for the outer end of the cup and thus increase its rigidity and it also tends to force the gasket portions within it in a direction toward the outer surface of the pipe. At its outer end the follower, 9, is provided with an inwardly extending flange, 9b, the inner edge of which defines the pipe aperture of the follower.

10 represents a follower nut, which is interiorly threaded, at 10a, to engage the exterior threaded portions, 3, of the terminal portion of the fitting body and is provided with an inwardly extending flange, 10b, to engage the follower, 9, and force it inwardly to compress the gasket lengthwise and expand it transversely into sealing engagement with the exterior of the pipe and the wall of the packing recess, to make a tight joint, and to not only prevent the pressure fluid within the line from escaping, but also to prevent the pipe end from being blown or forced out of the fitting.

In Fig. 5 we have shown a slightly modified form of gasket in which, instead of providing a tapered inner surface from one end to the other, and varying in diameter from the minimum undersize to slightly greater than the maximum oversize exterior pipe diameter, we provide a plurality of shorter tapered surfaces, as at 8d, connected by transversely disposed shoulders, 8e, and forming a series of annular serrations, 8f. Each of the tapered faces, 8d, varies in diameter from that of the minimum undersize to a diameter slightly greater than the maximum oversize, like the previously described face, 8a, so that the average or pitch diameter of the serrations equals the diameter of maximum oversize pipe. When a pipe of greater outer diameter than the minimum undersize is inserted in the gasket, the serrations will be bent over in a direction toward the inner end of the pipe. In addition to accommodating the pipe sections of varying diameter, this construction increases the sealing efficiency of the gasket and tends to further hold the pipe within the fitting. It will be understood that the gasket is otherwise constructed as previously described, and the outer tapered portions, 8b, and 8c, have been given the same reference characters.

While it is not ordinarily necessary, we may in some instances provide the fitting with a locking ring, to lock the pipe end against displacement. Thus, in Figs. 7 and 8, we have shown a partial view similar to Fig. 4, in which a locking ring, 11, illustrated in detail in Figs. 9 and 10, is inserted in the inner end of the packing recess. This ring is slightly dished, that is, it is inclined to its axis and its inner edge, indicated at 11a, is beveled or sharpened, as indicated at 11b. The ring, 11, is also provided with radially disposed kerfs or slots, extending outward from its inner edge, to permit the ring to accommodate variations in the outer diameter of the pipe, and to enable it to roll from a conical position into a plane position substantially perpendicular to the axis of the pipe, regardless of variations of pipe diameter. This ring is inserted in the packing recess, 4, with its inner edge adjacent to the bottom or inner end of the recess, the body of the ring inclining outwardly and toward the outer end of the recess, and is directly engaged by the inner end of the gasket. The other parts are as hereinbefore described. Fig. 7 shows the position of the parts before the follower nut, 10, is drawn up. When the follower nut is drawn up, the endwise pressure on the follower, 9, and gasket, 8, will force the outer portions of the locking ring backward into contact with the bottom of the packing recess, bringing the ring, 11, into a plane substantially perpendicular to the axis of the terminal portion of the fitting and forcing the beveled or sharpened edge portions, 11b, between the kerfs or slots, 11c, to bite into the outer surface of the pipe and lock it against longitudinal movement with respect to the fitting.

In the preceding description we have described the construction at one terminal portion of the body of the fitting for making a tight joint between it and an inserted plain, or threaded, pipe end. It will be understood that where there are more than one terminal portions, as in collar couplings, L's, T's and crosses, the parts hereinbefore described will be duplicated as to each, and in the figures referred to which show a plurality of terminal portions, the above described parts are shown and indicated by corresponding reference numerals.

In Figs. 11 and 12 we have shown another modification of our invention applied to an L, one terminal portion of which is illustrated, and the parts corresponding with those shown in Figs. 1 to 4 are given the same reference numerals with the addition of 300. In this figure the follower, 309, is of cup form and the gasket, 308, is molded within it, or is molded to fit it and inserted therein, as preferred. The portion of the gasket within the cup shaped follower is of slightly smaller diameter than the inner end portion of the gasket forming an annular shoulder, 308x, see Fig. 12, against which the inner edge of the cup follower abuts, the inner portion of the gasket having its outer surface substantially flush with the outer surface of the contiguous portion of the follower. This form of fitting is assembled and drawn up in the manner previously described.

Fig. 13 illustrates a bell and spigot pipe section, 401, the bell end, 402, of which is provided with exterior screw threads, 403, a packing recess, 404, and an annular shoulder, preferably formed by an inwardly extending annular flange, 405, the inner edge of which determines the pipe aperture to receive the plain end, 406, of an adjacent pipe section. Obviously the recess, 404, may receive any of the forms of gasket and follower herein shown and described, and the gasket will be subjected to pressure to make a tight joint by the follower nut, in the manner previously described.

Fig. 14 shows more or less diagrammatically the manner in which our invention is applicable to collar couplings, T's and crosses, the parts corresponding with those in Fig. 1, being designated by the same numerals with the addition of 500. Thus we have shown in full lines the body of the fitting at 501, in the form of a collar or sleeve, with two coaxial terminal portions, 502, each having the threaded portions, 503, recesses, 504, annular shoulder, 505, and stops, 507. Any of the forms of gaskets and followers hereinbefore described may be employed in connection with the follower nuts. In making a T, the body, 501, will be provided with a third terminal portion, indicated in dotted lines at 502a, of the same construction, and in making a cross the body, 501, will have still another similar terminal portion as indicated in dotted lines, at 502b.

In Fig. 15, we have shown a sleeve coupling, somewhat similar to the well known Dresser coupling, but embodying our present invention. In this figure, 601, represents the sleeve, provided in this instance with a centering bead or projection, 601a, which however may be omitted. The sleeve, 601, is provided at each end with an annular packing recess, 604, terminating at its inner end in an inclined annular shoulder, 605. The exterior of the portion of the sleeve surrounding the packing recess is threaded, as at 602, to receive the follower nut, 610. The gaskets, 608, are provided with wedge shaped inner ends, 608a, to engage the inclined shoulders, 605, and a metal follower, 609, encloses the outer portion of each gasket, and extends upon the outer face of the same, to engage the follower nut. As these nuts, 610, are screwed up the gaskets are compressed between the walls of the packing recesses, the inclined shoulders thereof, and the exterior of the pipe sections, 606, which may or may not be threaded, thus making a tight joint at each end of the sleeve. This form of sleeve, 601, can be very easily produced from steel tubing by cold processes and is particularly advantageous for this reason.

Fig. 16 shows a sleeve coupling adapted for threaded pipes, embodying a further modification of our invention. The sleeve, 701, has a central portion of smallest internal diameter, internally threaded at 701a, between the annular recess, 701b. These internal threads are only intended to hold the pipe sections, 706, 706, in the fitting, and are not intended to seal the joint. The threads, 701, may therefore be either straight or tapered, and if straight, the fitting may be tapped entirely through from one side. This does not prevent the use of pipes having the usual standard taper threads, as they come from the pipe mills. The ends of the sleeve are provided with packing recesses, 704, to receive the gaskets, 708, provided with metal followers, 709, and the ends of the sleeve are exteriorly threaded to receive the follower nuts, 710, all substantially as shown and described in Fig. 14, except for the provision of internal threads in the metallic sleeve to directly engage threaded portions of the pipes. The fitting shown in Fig. 16 is particularly desirable in certain locations for example, in high pressure air lines, air mining and construction operations. Such lines are subjected to considerable abuse and ordinary threaded couplings invariably develop leaks. This fitting combines the advantages of a screw collar with some advantages of a rubber packed coupling. Of course it does not permit endwise movement of the pipes as do the other forms of coupling herein shown, but there are many places where this is not of importance, as where lines be above ground where the ends are unconstrained.

Where the sleeve, 701, is threaded entirely through from one side, as herein shown, the fitting is obviously especially adapted for pneumatic tube systems, where it is essential that the inner sleeve walls be in perfect alignment, and that the ends of the pipe sections butt together.

It will be seen that our invention provides an extremely simple fitting or pipe joint for use with plain unthreaded or threaded pipe ends to connect bell and spigot pipes, or in the form of L's, collars, T's or crosses, to connect the plain or threaded ends of pipe sections in any of the ways that threaded pipes are connected by the customary use of screw threaded fittings. As the pipe ends do not have to be threaded, much time and labor is saved in using our improved fittings without any loss of efficiency, as the fittings herein described will connect pipes to withstand leakage or pulling out under any pressure to which they are subjected. Our fittings can also be manufactured at extremely low cost by reason of their simple construction, and the small amount of rubber necessary in forming the gasket.

The internally threaded follower nuts 10, 310, 410, 510, 610 and 710, may be formed with a cylindrical exterior surface, in which case they can be readily turned up by the use of the ordinary Stillson wrench, or other suitable tool, or these nuts may have their exterior surface polygonal, that is to say, hexagonal or octagonal, or any other polygonal form as may be found most desirable.

What we claim and desire to secure by Letters Patent is:

1. In a pipe joint, the combination with a hollow body having a terminal portion provided with an annular packing recess, and a threaded portion, of a yielding annular gasket extending into said recess having its inner surface tapered and increasing gradually in diameter throughout substantially the entire length of the gasket, to accommodate variations in the external diameter of the pipe, a non-yielding metal follower for engaging said gasket and having a substantially cylindrical portion surrounding the outer end of the gasket and extending into said recess, and an inwardly extending flange engaging the outer end of the gasket, leaving the inner face of the gasket throughout substantially its entire length exposed for direct contact with the pipe to be connected with said hollow body, and a follower nut.

2. In a pipe joint, the combination with a hollow body having a terminal portion provided with an annular packing recess, and a threaded portion, of a yielding annular gasket extending into said recess and having its inner surface tapered throughout substantially its entire length, and increasing in diameter from that substantially equal to the outer diameter of a minimum undersize pipe, at the inner end of said tapered portions, to that substantially equal to the outer diameter of a maximum oversize pipe, a non-yielding metal follower and having a substantially cylindrical portion surrounding the outer end of the gasket and extending into said recess, and an inwardly extending flange engaging the outer end of the gasket, leaving the inner face of the gasket throughout substantially its entire length exposed for direct contact with the pipe to be connected with said hollow body engaging said gasket, and a follower nut.

3. In a pipe joint, the combination with a hollow body having a terminal portion provided with an annular packing recess, and a threaded portion, of a yielding annular gasket extending into said recess and having its inner surface provided with a succession of tapered portions extending substantially from one end of the gasket to the other, and each increasing in diameter from its inner end to its outer end, to accommodate variations in the outer diameter of the pipe, and assist in preventing the withdrawal of the pipe, a non-yielding metal follower and having a substantially cylindrical portion surrounding the outer end of the gasket and extending into said recess, and an inwardly extending flange engaging the outer end of the gasket, leaving the inner face of the gasket throughout substantially its entire length exposed for direct contact with the pipe to be connected with said hollow body, and a follower nut.

4. In a pipe joint, the combination with a hollow body having a terminal portion provided with an annular packing recess, and a threaded portion, of a yielding annular gasket having its outer surface adjacent to the outer end of the gasket tapered and decreasing in diameter toward said outer end, a cup shaped non-yielding follower, having its inner surface tapered to correspond with said tapered portion of the gasket to stiffen the follower and press the gasket toward the pipe, and a follower nut.

5. In a pipe joint, the combination with a hollow body having a terminal portion provided with an annular packing recess, and a threaded portion, of a yielding annular gasket having its inner surface provided with tapered portions increasing in diameter in a direction toward the outer end of the gasket, and its outer surface provided adjacent to its outer end with a tapered portion decreasing in diameter toward the outer end of the gasket, and at its inner end with a more sharply tapered portion decreasing in diameter from the inner end of the gasket to the first mentioned exterior tapered portion, to form an annular recess, a cup shaped metal follower having its inner surface tapered to conform to the outer end portion of the gasket, and a follower nut.

6. In a pipe joint, the combination with a hollow body provided with a terminal portion having an annular packing recess to receive a pipe end, a gasket for said recess having its interior surface provided with a plurality of tapered portions each increasing in diameter in a direction toward the outer end of the gasket, and separated by annular faces disposed substantially perpendicular to the axis of the gasket, to accommodate variations in the size of the pipe and assist in preventing the withdrawal of the pipe, said gasket having its outer surface adjacent to its outer end tapered and decreasing in diameter toward said outer end, and its inner end portions more sharply tapered from said first mentioned tapered portion toward the inner end of the gasket and forming an annular recess at the intersection of said tapered portions, a cup shaped metal follower fitting the outer end portion of said gasket, and means having portions for engaging said follower to exert pressure on said gasket in a direction longitudinally of said packing.

7. In a pipe joint, the combination with a hollow body having a terminal portion provided with an annular packing recess having an inner cylindrical face and an inwardly extending annular shoulder terminating in an aperture capable of permitting the passage of a pipe therethrough, a pipe extending through said recess and pipe aperture, a compressible gasket in said recess surrounding the pipe, of a metal locking ring adapted to be interposed between the said shoulder and the inner end of said gasket, with its inner edge portions in engagement with the pipe, said ring normally inclining from the pipe outwardly toward the inner end of said recess and having its outer edge portions engaging the inner end of said gasket adjacent to the wall of the recess, and means for applying pressure to the outer end of said gasket in a direction toward said shoulder, whereby the outer edge of the locking ring will be forced toward said shoulder and said gasket will form a tight joint between the outer face of the pipe and the wall of the recess, regardless of the position of the locking ring.

8. In a pipe joint, the combination with a hollow body having a terminal portion provided with an annular packing recess having an inner cylindrical face and an inwardly extending annular shoulder terminating in an aperture capable of permitting the passage of a pipe therethrough, a pipe extending through said recess and pipe aperture, a compressible gasket in said recess surrounding the pipe, of a metal locking ring adapted to be interposed between the said shoulder and the inner end of said gasket, with its inner edge portions in engagement with the pipe, and with the portion of said shoulder adjacent thereto, said ring normally inclining from the pipe outwardly toward the outer end of said recess, and having its outer edge portions engaging the inner end of said gasket adjacent to the wall of said recess, a cup shaped metal follower engaging the outer end of the gasket, and fitting said packing recess, and a follower nut engaging said hollow body, and having an annular portion rotarily engaging said cup shaped follower, whereby the outer edge of said locking ring will be forced inwardly toward said shoulder when the follower nut is screwed up, and the gasket will form a tight joint between the outer surface of the pipe and the wall of the recess, regardless of the position of the packing ring.

9. In a pipe joint, the combination with a hollow body having a terminal portion provided with an annular packing recess having a cylindrical inner face and a shoulder at its inner end extending inwardly therefrom and terminating in a pipe aperture for the passage therethrough, of a pipe to be connected with said hollow body, and a threaded portion, of a yielding annular gasket having its inner surface provided with tapered portions increasing in diameter in a direction toward the outer end of the gasket, and its outer surface provided adjacent to its outer end with a tapered portion decreasing in diameter toward the outer end of the gasket, and at its inner end with a more sharply tapered portion decreasing in diameter from the inner end of the gasket to the first mentioned exterior tapered portion, to form an annular recess, a cup shaped metal follower having a flange for engaging the outer end of said gasket and a cylindrical portion fitting within said recess, adapted to surround the gasket adjacent to its outer end and having its inner surface tapered to conform to the outer end portion of the gasket, a follower nut, and a metal locking ring between the inner end of said packing ring and the gasket having a slotted inner edge for engaging the pipe and the portion of said shoulder adjacent to said pipe aperture, and an outer edge for engaging the wall of said recess and said gasket.

10. In a pipe joint, the combination with a hollow body having an exteriorly threaded terminal portion provided interiorly with a packing recess terminating at its inner end in a pipe receiving aperture of smaller diameter than said recess, a pipe extending through said recess and substantially fitting said pipe aperture, of a rubber gasket surrounding the pipe and having its inner rubber surface throughout substantially the entire length of the gasket in contact therewith, and having its outer end projecting beyond said recess in its uncompressed condition, a cup-shaped non-yielding follower provided with a cylindrical portion surrounding the outer end of the gasket and extending into said recess, and a follower nut engaging said cup-shaped follower and having a rotary movement with respect thereto in compressing the gasket.

11. In a pipe joint, the combination with a hollow body, an exteriorly threaded cylindrical terminal portion provided interiorly with a packing recess, terminating at its inner end in a pipe aperture of smaller diameter than said recess, of a tubular rubber gasket for surrounding a pipe end, said gasket extending into said recess, and having its outer surface adjacent to its outer end tapered and decreasing in diameter toward the outer end of the gasket, a cup shaped follower enclosing the outer end of said gasket and having a substantially cylindrical outer surface to extend within said recess, and an inwardly extending flange engaging the outer end of the gasket, said cylindrical portion of the said follower having its interior surface tapered to correspond with the said tapered outer surface of the gasket, and a follower nut having interior threaded portions, and an inwardly extending flange to engage the follower.

12. In a pipe joint, the combination with a hollow body, an exteriorly threaded cylindrical terminal portion provided interiorly with a packing recess, terminating at its inner end in a pipe aperture of smaller diameter than said recess, of a tubular rubber gasket for surrounding a pipe end, said gasket extending into said recess, and having its outer surface adjacent to its outer end tapered and decreasing in diameter toward the outer end of the gasket, a cup shaped follower enclosing the outer end of said gasket and having a substantially cylindrical outer surface to extend within said recess, and an inwardly extending flange engaging the outer end of the gasket, said cylindrical portion of the said follower having its interior surface tapered to correspond with the said tapered outer surface of the gasket, and a follower nut having interior threaded portions, and an inwardly extending flange to engage the follower, said gasket having its exterior surface tapered and increasing in diameter from a point adjacent to the inner end of said follower, to a point adjacent to the inner end of the gasket.

13. In a pipe joint, the combination with a hollow body, an exteriorly threaded cylindrical terminal portion provided interiorly with a packing recess, terminating at its inner end in a pipe aperture of smaller diameter than said recess, of a tubular rubber gasket for surrounding a pipe end, said gasket extending into said recess, and having its outer surface adjacent to its outer end tapered and decreasing in diameter toward the outer end of the gasket, a cup shaped follower enclosing the outer end of said gasket and having a substantially cylindrical outer surface to extend within said recess, and an inwardly extending flange engaging the outer end of the gasket, said cylindrical portion of the said follower having its interior surface tapered to correspond with the said tapered outer surface of the gasket, and a follower nut having interior threaded portions, and an inwardly extending flange to engage the follower, said gasket having its exterior surface tapered and increasing in diameter from a point adjacent to the inner end of said follower, to a point adjacent to the inner end of the gasket, the tapered portions adjacent to the inner end of the gasket being at a greater angle to the axis of the gasket than the tapered portions adjacent to the outer end of the gasket to form an angular shaped annular recess when the gasket is in an uncompressed condition.

14. In a pipe joint, the combination with a hollow body having an exteriorly threaded terminal portion provided interiorly with a packing recess terminating at its inner end in a pipe receiving aperture of smaller diameter than said recess, a pipe extending through said recess and substantially fitting said pipe aperture, of a rubber gasket surrounding the pipe and having its inner rubber surface throughout substantially the entire length of the gasket in contact therewith, and having its outer end projecting beyond said recess in its uncompressed condition, said gasket having its inner surface tapered and of smaller diameter adjacent to its inner end than at its outer end to accommodate variations in pipe diameter, a cup-shaped nonyielding follower provided with a cylindrical portion, surrounding the outer end of the gasket, extending into said recess and adapted to engage the wall of the recess with a sliding fit, and an inwardly extending flange at the outer end of said follower engaging the outer end of the gasket exterior to said recess and a follower nut having interior threaded portions for engaging the exterior threaded portions of the hollow body, and an inwardly extending flange for engaging the inwardly extending flange of the cup-shaped follower, and having a rotary movement with respect thereto in compressing the gasket.

15. In a pipe joint, the combination with a hollow body, having an exteriorly threaded cylindrical terminal portion provided interiorly with a packing recess, terminating at its inner end in a pipe aperture of smaller diameter than said recess, of a tubular rubber gasket for surrounding a pipe end, said gasket extending into said recess, and having its inner surface tapered and of smaller diameter adjacent to its inner end than at its outer end to accommodate variations of pipe diameters, and having its outer surface adjacent to its outer end tapered and decreasing in diameter toward said outer end, a follower having a substantially cylindrical portion enclosing the outer end portion of said gasket, and fitting within said recess, and having an inwardly extending flange engaging the outer end of said gasket, said cylindrical portion having its inner surface tapered to conform with the enclosed portions of the gasket, and a follower nut having threaded portions to engage said terminal portion and an inwardly extending flange to engage the outer end of said follower.

16. In a pipe joint, the combination with a hollow body, having an exteriorly threaded cylindrical terminal portion provided interiorly with a packing recess, terminating at its inner end in a pipe aperture of smaller diameter than said recess, of a tubular rubber gasket for surrounding a pipe end, said gasket extending into said recess, and having its inner surface tapered and of smaller diameter adjacent to its inner end than at its outer end to accommodate variations of pipe diameters, and having its outer surface adjacent to its outer end tapered and decreasing in diameter toward said outer end, a follower having a substantially cylindrical portion enclosing the outer end portion of said gasket, and fitting within said recess, and having an inwardly extending flange engaging the outer end of said gasket, said cylindrical portion having its inner surface tapered to conform with the enclosed portions of the gasket, the inner end portion of said gasket having its outer surface tapered and increasing in diameter from the inner end of the cylindrical portion of said follower to a point adjacent to the inner end of the gasket, to form an annular recess adjacent to the inner end of said cylindrical portion, and a follower having threaded portions to engage said terminal portion of the fitting and an inwardly extending flange to engage the outer end of said follower.

GEORGE H. PFEFFERLE.
CHARLES E. NORTON.